United States Patent [19]
Herkert

[11] Patent Number: 4,801,934
[45] Date of Patent: * Jan. 31, 1989

[54] METHOD AND APPARATUS FOR TRANSMISSION OF DATA WITH DATA REDUCTION

[75] Inventor: Hans Herkert, Hohenschaeftlarn, Fed. Rep. of Germany

[73] Assignee: Siemens Aktiengesellschaft, Berlin and Munich, Fed. Rep. of Germany

[*] Notice: The portion of the term of this patent subsequent to Oct. 6, 2004 has been disclaimed.

[21] Appl. No.: 784,110

[22] Filed: Oct. 4, 1985

[30] Foreign Application Priority Data

Oct. 4, 1984 [DE] Fed. Rep. of Germany ....... 3436441

[51] Int. Cl.$^4$ ...................... H04Q 9/00; H04L 11/00; G08B 25/00
[52] U.S. Cl. .......................... 340/825.020; 340/825.52; 340/517; 178/3
[58] Field of Search ...................... 340/825.02, 825.03, 340/825.04, 825.8, 825.52, 825.26, 825.52, 517; 370/60, 61, 58, 99, 112; 375/3; 179/18 FH; 178/2, 3

[56] References Cited

U.S. PATENT DOCUMENTS

| | | | |
|---|---|---|---|
| 3,693,155 | 9/1976 | Crafton et al. | 340/825.02 |
| 3,952,287 | 4/1976 | Vié | 340/825.8/ |
| 4,081,612 | 3/1978 | Hafner | 340/825.52 |
| 4,250,489 | 2/1981 | Dudash et al. | 340/825.02 |
| 4,254,411 | 3/1981 | Moser et al. | 340/517 |
| 4,354,263 | 10/1982 | Bordry et al. | 370/60 |
| 4,445,171 | 4/1984 | Neches | 370/60 |
| 4,698,628 | 10/1987 | Heckert et al. | 340/825.02 |

FOREIGN PATENT DOCUMENTS

3032619 3/1982 Fed. Rep. of Germany .
3110590 1/1983 Fed. Rep. of Germany .

Primary Examiner—Donald J. Yusko
Attorney, Agent, or Firm—Hill, Van Santen, Steadman & Simpson

[57] ABSTRACT

In a transmission network having a tree structure in which data is forwarded from the tree branches toward the trunk at periodic intervals, the data which is transmitted between the several network levels is transmitted in data blocks each having a status field and a data field, the status field identifying the status of stations at a lower level in the network. The information in the status field is reduced by deleting data corresponding to a predetermined status information content corresponding to the most probable configuration of such data. The remaining status data is divided into sub-sets and transmitted with an individual sub-address for each sub-set, and a control signal identifying the number of sub-sets which are transmitted, and an address identifying the sending station.

6 Claims, 7 Drawing Sheets

METHOD AND APPARATUS FOR TRANSMISSION OF DATA WITH DATA REDUCTION

BACKGROUND OF THE INVENTION

1. Field of the Invention

The present invention relates to a method and apparatus for data transmission and particularly to data transmission in which information relating to operating status is transmitted along with other data.

2. Prior Art

A method of data transmission from one station to another for remote control, in which the transmitting stations are monitored, is described in German Pat. No. OS 30 32 619, which relates to a system having two levels, i.e. a control station and sub-stations. However, multi-level systems have advantages over a two-level system especially in connection with data reduction techniques.

One form of data reduction, using data processing, which can be undertaken in the nodes of a multi-level network involves old-new comparison. For example the computer may send the entire data stream which it manages to one of the nodal points, when any signal status has changed. Subsequently, the new signal status is acknowledged and replaces the old status. This allows the new data stream to be sent only once, but leads to errors and omissions of signals when there is a disturbance of the data in transmission or in acquisition. In order to allow for the possibility of such errors, complicated hand-shakings must be introduced between levels. The system becomes even more complicated when a higher level data processing is employed, in the nodes, for example, suppression of successor reports. The system is further complicated when an attempt is made to provide means for dealing with a failed supply voltage, or to allow the undertaking of repair work on the system.

BRIEF DESCRIPTION OF THE INVENTION

The status reporting and self-monitoring features of the present invention are advantageously employed with a data transmission system employing data reduction in a multilevel network structure, such as shown and described in the copending application of Herkert et al, Ser. No. 784,111 filed of even date herewith, the disclosure of which application is hereby incorporated by reference.

In connection with the above Herkert et al invention, it has been determined that a particularly transparent operating mode is established for a data processing system connected to the trunk of a network having a tree structure, when such a system constantly receives the data from the network in non-preprocessed form, so that a significant data reduction is possible with reference to the most probable data condition.

A principal object of the present invention is to provide a method which allows data and status information to be transmitted over a network having a tree structure, so that a receiving location receives status information relating to a plurality of lower level stations. The receiving locations are in a position to receive and reconstruct transmitted data in its original form, as well as the status information.

In accordance with the present invention, the method for achieving this object involves the transmission of status information and data in data blocks having two parts with a status part and a data part, each having information organized into sub-sets. The sub-sets which have an informational content coinciding with a predetermined reference content are being suppressed in the transmitting stations. The data blocks are transmitted with the address of the transmitting station, a status control signal and the sub-sets to be transmitted, with sub-set addresses. The status control signal and the sub-set addresses contain information about the number and allocation of the sub-sets following the status control signal.

The present invention achieves the advantage that a relatively low transmission capacity of the data line is required. The data receiving location, preferably formed by a data processing system connected to the trunk of a multi-level network, is well supplied with information in non-reduced raw data form. In signal acquisition systems, in which many status signals are capable of being transmitted, but in which few error-indicating status messages are present at any one time, the data flow of status information over the nodal points can be greatly reduced by using the present invention.

The present invention finds advantageous application in the case of signal acquisition facilities for central operations observation of a message transmission network handling long distance traffic, since an extremely large part (more than 95%) of such a network generally functions in a disruption free or error-free manner.

BRIEF DESCRIPTION OF THE DRAWINGS

Reference will now be made to the accompanying drawings in which.

DESCRIPTION OF THE PREFERRED EMBODIMENTS

Figure 1:
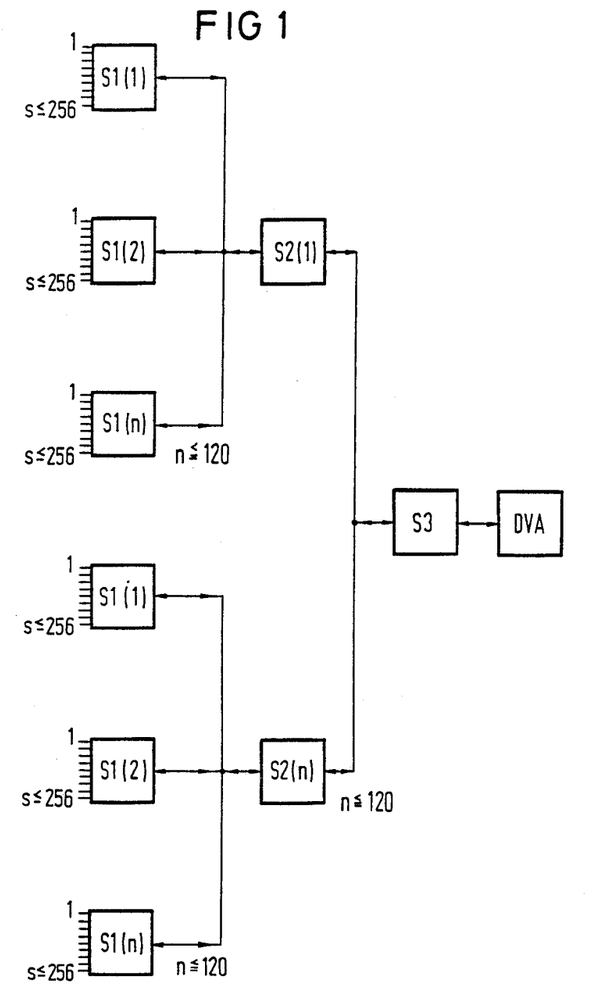
FIG. 1 is a functional block diagram of a local signal acquisition network, with a tree structure, and having stations at three different levels.

FIG. 1 illustrates a data acquisition network with a tree structure having stations in a plurality of network levels. The station has three network levels, the third being connected to the data processing arrangement DVA. The stations $S2(l)$ through $S2(n)$ are connected to the station S3 with only two of the stations being explicitly shown. The number of stations in the second network level may be any number up to 120.

A plurality of stations S1(*l*) through S1(*n*) are respectively connected to the stations S2(*l*) and S2(*n*) of the second network level, with only six of such stations being shown explicitly. There can be up to 120 stations in the first network level connected to each of the stations in the second network level.

Each station of the first network level has up to 256 one-bit inputs.

Figure 2:
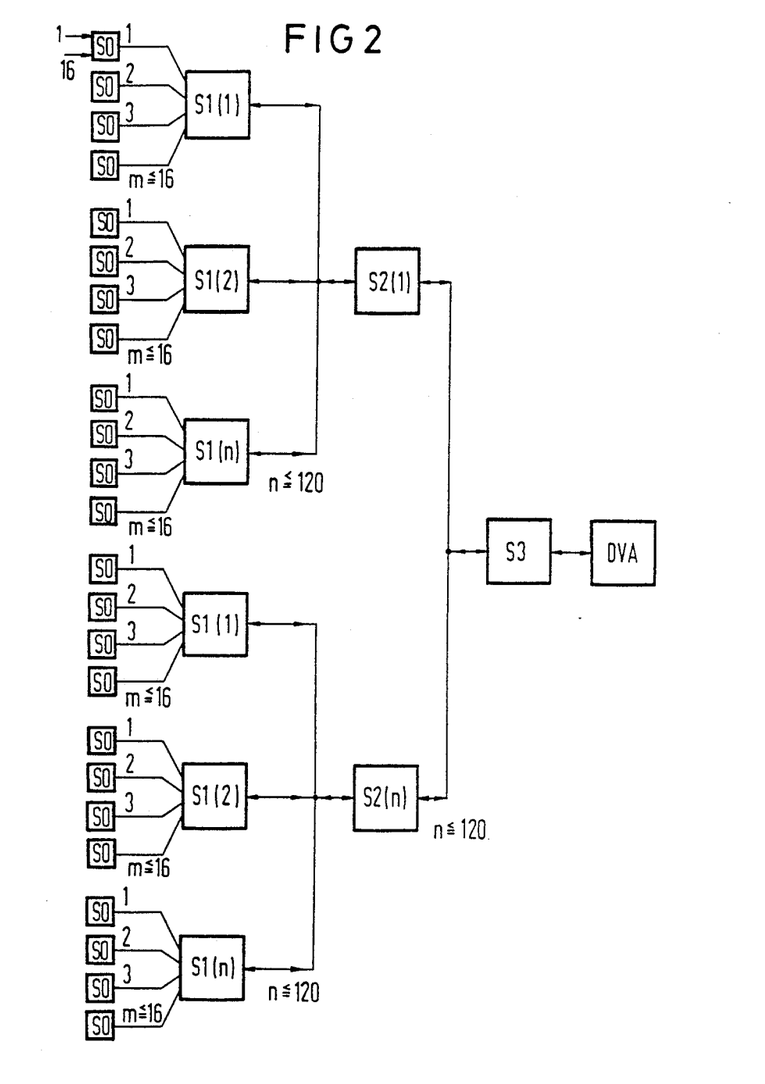
FIG. 2 is a functional block diagram of a network having a tree structure in which a plurality of data generators are connected to the stations of the first network level.

The signal acquisition network shown in FIG. 2 coincides largely with that of FIG. 1, except that in FIG. 2 a plurality of signal generators S0(*l*) through S0(*m*) are connected to each of the stations of the first network level. Only four of the signal generators are shown explicitly for each station of the first network level. Up to sixteen signal generators may be connected to each station, and each signal generator may comprise for example sixteen one-bit signal sources.

In the networks of both FIGS. 1 and 2, the stations are connected by way of bus lines with a station at the next level, and are preferably operated in half-duplex operation. The station S3 is located at the trunk or head of the network and the signal generators S0 of FIG. 2 lie at the branches. The locations of stations at the first and second network levels are referred to as nodes of the data network.

As shown in FIG. 2, the signal generators are connected to individual inputs of respective stations of the first network level.

Instead of the tree network illustrated in FIGS. 1 and 2, a star-shaped network configuration may be employed.

The signal acquisition devices illustrated in FIGS. 1 and 2 acquire discrete signals or individual bits. These discrete signals may indicate, for example, the status of a device or a device function, or of a system condition. All of these bits are monitored, and are communicated to the data processing system DVA as a transmission message.

In the ideal condition, when the system being monitored is functioning perfectly, all of the signal sources have the condition "0". When an error or abnormal condition occurs at any location of the monitored system, this is reported by changing the signal being monitored from 0 to 1. In general, none or very few of the signals assume the status "1". A data field in which all of the bits are equal to 0 therefor serves as a reference content for the information to be transmitted, corresponding to the most probable condition of the system.

Figure 3:
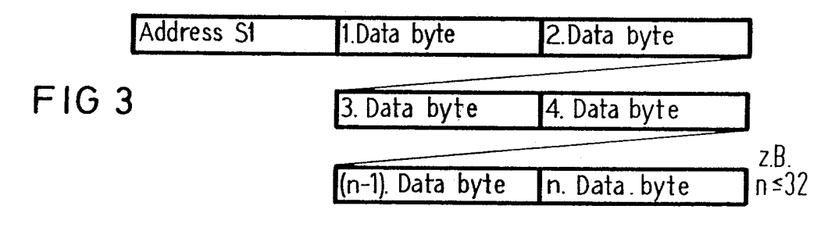
FIG. 3 is a diagrammatic illustration of a message without data reduction which may be sent out by each of the stations at the first level of the data network of FIG. 1.

Referring to FIG. 3, data blocks are illustrated which are transmitted from the stations of the first (lowest level) network level. These data blocks each comprise an address field made up of a plurality of bytes, and an information field comprising a great number of bytes. In the illustration of FIG. 3, the address identifies the particular station of the first network level S1, and this address is followed by n data bytes, one for each of the signal inputs to that station.

Figure 4:
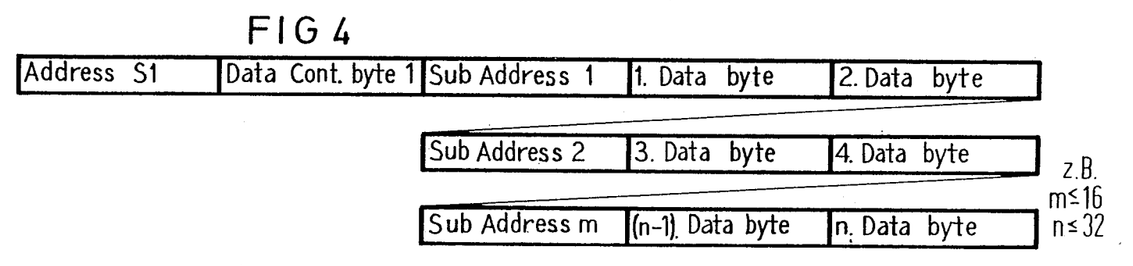
FIG. 4 is an illustration of a data block of a message which may be sent by a station at the first network level, with the possibility of data reduction.

FIG. 4 illustrates a data block which may be transmitted from the lowest level of the first network level with the possibility of data reduction. As shown in FIG. 4, the station identifier or address of the station at the first network level S1 is followed by a data control byte, after which a plurality of data bytes are transmitted, in sub-groups of two bytes each, with each sub-group being preceeded by a sub-address in the form of an additional data byte. Using the data block of FIG. 4, the data which is actually transmitted may be reduced by transmitting only those sub-sets in which the information field has one or more "1"'s. The number of sub-sets is identified by the data control byte, which designates the number of data bytes following in the transmission. Each of the sub-addresses 1, 2, m, as illustrated in FIG. 4, identify the location where an alarm condition (or a signal level of "1") exists.

Figure 5:
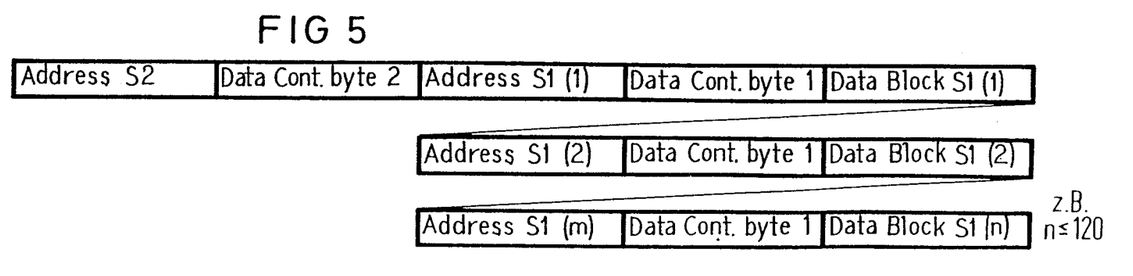
FIG. 5 is an illustration of a data block transmitted by a station at the second network level, with the possibility of data reduction.

FIG. 5 illustrates a data block which is sent out from a station in the second network level. It first sends its own station identifier or address S2, followed by a data control byte 2 identifying the number of data blocks which follow. Each of the data blocks (one on each line of FIG. 5) takes the form of the data block illustrated in FIG. 4, namely, the station identifier or address of a station of the first network level, followed by its data control byte 1, identifying the number of information sub-groups which follow, after which the sub-address and the associated information sub-groups are transmitted for one or more sub-groups. It can be seen that this allows for data reduction by transmitting from the second network level S2 only the addresses and data of the stations of the first network level S1 which have binary "1"'s to report, together with the sub-addresses identifying the data sub-groups, and the sub-groups themselves which have binary 1's.

Thus the data reduction is achieved because the data block sent out from a station of the second network level is composed only of an address field for its own address, a control field indicating how many nodes or stations of the first level are represented in the following transmission, and then a primary data block for each non-zero reporting station of the first level identifying how many sub-sets have an alarm condition, together with the sub-address of the sub-set having an alarm condition, with its appertaining data.

The identifier or addresses of the stations or the signal generators S0 of FIG. 2 serve as sub-addresses. In the signal acquisition network of FIG. 1, the sub-sets from the stations of the first network level are provided with predetermined sub-addresses, preferably in numerical sequential order.

Figure 6:
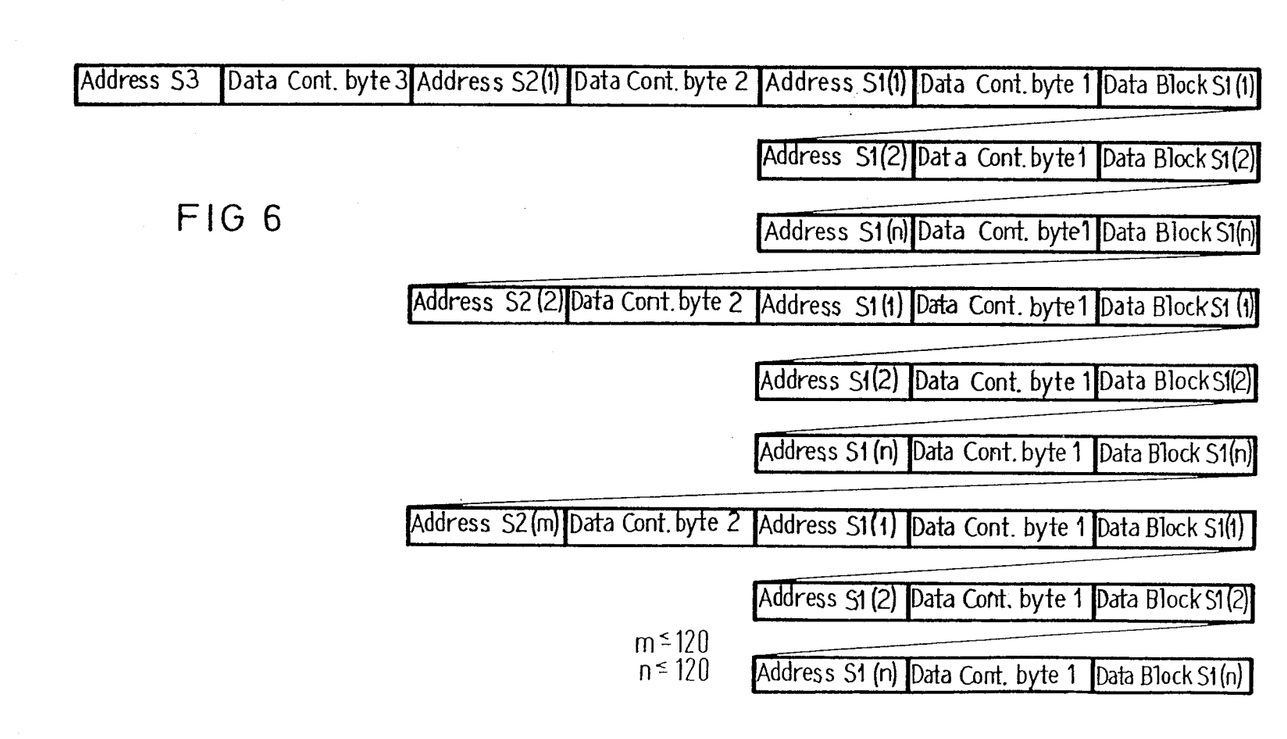
FIG. 6 is an illustration of a data block transmitted by a station at the third network level to the data processing system, with the possibility of data reduction.

FIG. 6 illustrates a data block which is sent from the stations of the third network level to the data processing apparatus DVA. It is organized in the same manner as has been described above. This data block first identifies the station of the third network level (of one or a plurality of such stations). This is followed by a data control byte which identifies the number of following data blocks like that shown in FIG. 5. Then data blocks like the data blocks of FIG. 5 follow, each occupying three successive lines of the illustration in FIG. 6. It is seen that the data reduction which takes place at the third network level has the same character as the data reduction described above, namely only sub-groups with binary 1's are transmitted, and normal conditions are omitted from the transmission.

Figure 8:
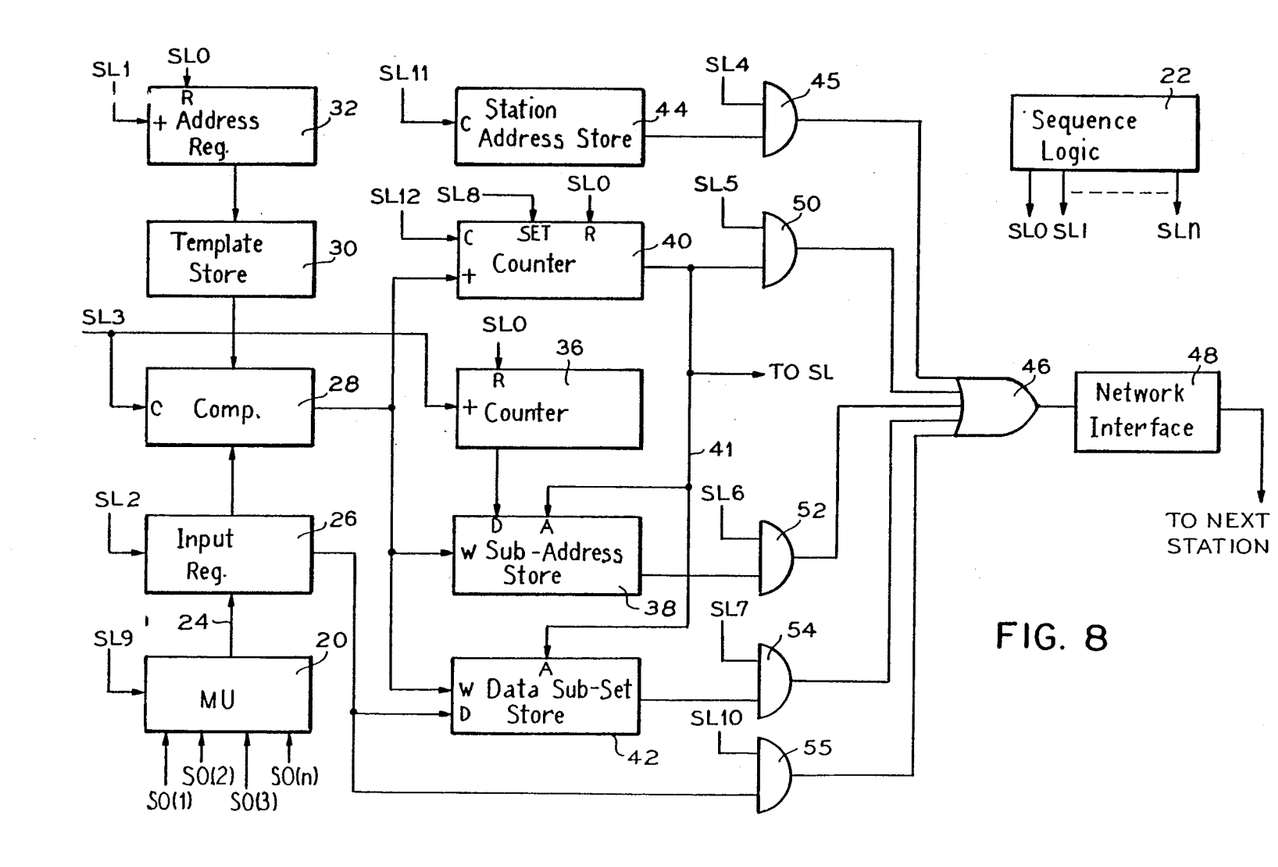
FIGS. 8–10 illustrate different embodiments for constructing the data blocks at different levels of the network.

Referring to FIG. 8, apparatus is illustrated by which the data blocks of the present invention may be constructed. FIG. 8 illustrates an arrangement at the lowest level of the network, in which individual data sources serve as inputs. The several inputs S0(1), S0(2), S0(m) etc. are connected to the inputs of a multiplexer 20, which receives timing signals on line SL9 from a sequence logic unit 22, so that the output line 24 of the multiplexer presents one of the inputs, as selected by the multiplexer 20, to an input register 26. The sequence logic unit 22 produces signals at times required to perform the necessary functions as described below. The register 26 may be one or several bits in length, in accordance with the length of the data on the input being sampled. In the case of a single bit inputs, only one storage location or flip flop is required for the register 26. The output of the register 26 is connected to one input of a comparator 28, and another input of the comparator 28 is connected to an output of a template storage device 30, which stores information corresponding to the normal or quiescent condition of the particular input being sampled. The template storage unit 30 is addressed by means of an address register 34, under control of the sequence logic unit 22 via lines SL1. In the case in which the nominal data values are all 0's, the template storage may be replaced by a constant signal source representing all 0's.

When the input register 26 has been loaded, and the template storage device 30 has been addressed to the nominal data corresponding to the selected input, the comparator 28 is energized by a signal on line SL2 from the sequence logic unit 22 to compare the input data with the expected data. In the event that a comparison occurs, no further operation is undertaken, and the multiplexer 20 is indexed to the next input line by a signal from the sequence logic unit 22, and the above procedure is repeated. Each time the comparator 28 is triggered, a counter 36 is also incremented, so that it manifests an identification of the input line which is being sampled at any given time.

In the case of a non-comparison, the comparator 28 produces an output signal, which is connected to the write input of a storage unit 38, the data input of which is connected to the counter 36. Accordingly, the storage unit 38 stores the address of the input line being sampled for which a non-comparison occurred. The output of the comparator 28 is also connected to a counter 40 for incrementing the counter 40, which manifests the number of non-comparisons which occur during the course of each complete scan of the multiplexer unit 20. The output of the comparator 28 is also connected to the write input of a storage device 42, which stores the data received from the register 26. The output of the counter 40 is connected over a line 41 to the address inputs of the storage units 38 and 42, so that the address and data corresponding to each input exhibiting a non-comparison is stored in successive storage locations within the storage units 38 and 42. The line 41 is also connected to an input of the sequence logic unit 22, for a purpose explained below.

The above sequence is repeated for each input connected to the multiplexer unit 20, so that at the end of a complete scan of such inputs the counter 40 manifests the number of inputs which did not exhibit the expected data stored in the template storage device, and the storage units 30 and 42 manifest the identification of the non-corresponding inputs and their data, respectively. The units 40, 38 and 42 are used to construct a data block header which has been described above in connection with FIG. 4. In addition, the storage unit 44, which permanently stores the station identifier or address, is also used to construct the block header.

Under the control of the sequence logic unit 22 over lines SL4 and SL11, the contents of the storage unit 44 is first read out through an AND gate 44 and an OR gate 46 to an interface unit 48 such as a modem or the like which performs the transformation necessary to interface with the transmission line 50 of the network leading to the next station (at the S2 level). In this way the first byte of the block header is transmitted, corresponding to the level S1 station identification. Following this the sequence logic unit 26 over lines SL5 and SL12 causes the counter 40 to be read out through an AND gate 50 and the OR gate 46 through the network interface unit 48, for transmitting the data control byte identifying the number of sub-addresses and information sub-sets which follow. Then the first sub-address is read from the storage unit 38 under control of line SL6 through an AND gate 52 to an input of the OR gate 46, for the first sub-address, after which the data corresponding to such sub-address is read from the storage unit 42 under control of line SL7 through an AND gate 45 into an input of the OR gate 46. Following this, the next sub-address is read from the storage unit 38, followed by data corresponding to that sub-address as stored in the storage unit 42. This is repeated for the number of sub-addresses with associated data sub-sets as identified by the counter 40 at the end of the scan procedure. The routes and registers 32, 36 and 40 are reset as required by signals over the lines SL0. If desired, the counter 40 may be incremented under control of the sequence logic 22 to successively address the storage locations within the storage units 42 and 38 in which the sub-addresses and data sub-sets to be transmitted are stored.

In the event that more than two-thirds of the data sub-sets do not correspond with their nominal values, it is expeditious to transmit all of the sub-sets, without sub-addresses. The number of sub-sets is communicated to the sequence logic unit from he counter 40 over the line 41, and when this number exceeds a predetermined value, such as two-thirds of the total inputs, the counter 40 is set to its maximum value by a signal SL8 from the sequence logic unit 22, to identify the condition to the receiving station. Then the block transmission procedure is initiated, in which the station address and the data control byte are first transmitted from storage units 44 and 40, after which the multiplexer 20 is caused to cycle through a scanning cycle, supplying each input sequentially to the input register 26, but then the contents of the input register are immediately supplied under control of line SL10 through an AND gate 55 to the OR gate 46 for transmission. In this way, transmission of all the data takes place without reduction, and this is indicated by the content of the data control byte.

To accommodate the necessity of serial transmission over the transmission line 50, the storage units 44, 40, 38 and 42 are preferably equipped with shift register outputs so that the data manifested therein can be shifted out one bit at a time to form the various components of the data block header as described above.

Following transmission of the block header as described above, the various inputs connected to the multiplexer 20 are again sampled so that the entire sequence is repeated continuously, with each block transmitted by the apparatus of FIG. 8 corresponding to the block illustrated in FIG. 4. Although this results in the transmission of spaced blocks, because of the time required for scanning the inputs, alternatively the apparatus may be made to transmit blocks continuously by duplication of the storage units 36–44 and by driving the duplicate sets of these units alternately, so that each set is used for scanning while the other is used for transmission of the output data block and vise versa. Alternatively, transmission of the entire block may be delayed until the next higher level station requests it by polling the transmitting station. The functions performed by the apparatus of FIG. 8 may also be performed by a general purpose computer such as a microcomputer, in which the functions of the sequence logic unit 22 are performed by a stored program, and the various storage devices occupy portions of the operating memory of the computer. The multiplexer 20 is, in that case, stopped under the control of the computer program, and supplies the various inputs one at a time to an input part of the computer, for processing as described above.

Figures 9, 10:
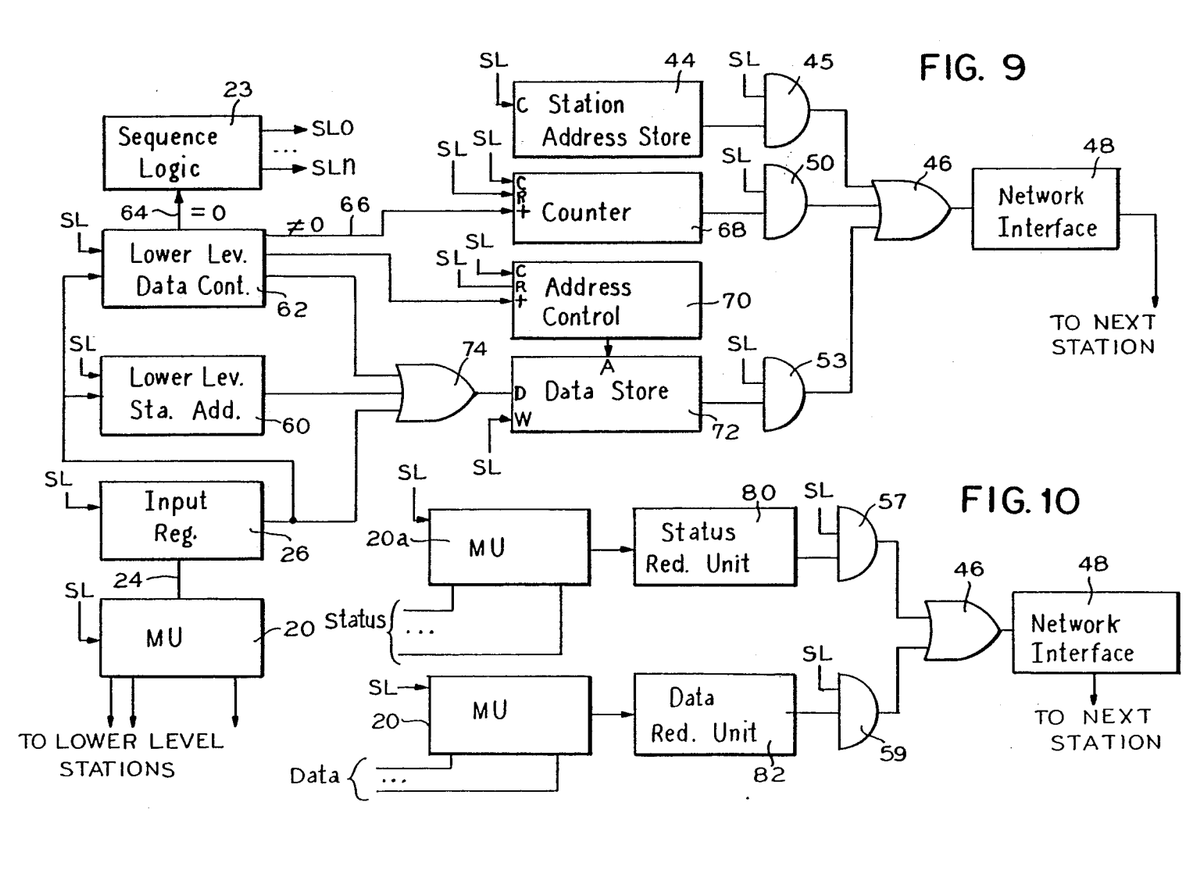

FIG. 9 illustrates apparatus associated with an upper level of the network. This apparatus differs from the apparatus illustrated in FIG. 8 in that no template storage is required and no comparison performed, since the entire message from a lower-level station is transmitted on by an upper level station, except in the case in which the lower-level station reports merely its address with a data control byte of 0, indicating that no data differs from the template. In this case, this message is suppressed at the upper level station in order to perform data reduction.

In FIG. 9, the multiplexer unit 20 is controlled by a sequence logic unit 23 to sample the several inputs from the lower-level stations, and supply them to the input register 26 over the line 24. The input register supplies the first byte to a storage unit 60, which byte identifies the address of the lower-level station whose data block is being sampled. The next byte received is loaded into the input register 26 and transferred to the storage unit 62, which temporarily stores the data control byte of the lower station. If this control byte is equal to 0, a signal is transmitted over line 64 to the sequence logic unit 23, so that the multiplexer 20 can be indexed to the next input. A control byte of 0 indicates that there is no data following the address and control byte, so that processing of the control block of that station is complete. The contents of registers 60 and 62 are discarded.

When the data control byte is not equal to 0, a signal appears at line 66 of the unit 62, which increments a counter 68. The content of the control byte register 62 is also supplied to an address control unit 70, which supplies appropriate address and control signals to a data storage device 72, for storing the addresses and data of the data block being received.

When a non-zero control byte is recognized, the lower-level station identifier or address in the register 60 is first stored at the next available storage location in the data storage unit 72, through an OR gate 74, after which the control byte stored in the register 62 is stored at the next storage location in the data storage unit 72. Following this, the rest of the data block being received from a lower-level station is stored in the data storage device 72 at successive address locations, under the control of the address controller 70.

When all of the data has been stored, the multiplexer 20 is indexed to the next lower-level signal, and the above operation repeated.

When the scan of all of the lower-level stations is complete, a control block is constructed for transmission through the OR gate 46 and the interface unit 48 to the next higher level station through AND gates 45, 50 and 53. The AND gate 45 is first enabled, and the content read out of the station identifier or address storage unit 44, to form the first byte of the control block. Next the counter 68 is read out through the AND gate 50, to form the data control byte for the control block. This identifies the number of lower-level data blocks which follow. Following this, the AND gate 53 is enabled and the data storage unit 72 is successively accessed at all of the storage locations at which the data blocks received from lower-level stations have been stored. When this operation is complete, the scanning of the input signals is again performed, so that the above operations are repeated continuously. In order to supply more frequent output blocks, the apparatus of FIG. 9 connected to the output of the input register can be duplicated so that one set can be used for data block transmission while the other set is used for scanning the input lines and the associated data and lower-level control blocks. For simplification, the timing and control signals from the sequence logic unit 23 have not been described in FIG. 9, but their timing and function will be obvious from the above functional description and the description of FIG. 8. Also, the apparatus of FIG. 9 may be replaced by a computer, with the sequence logic unit 23 is replaced by a suitable computer program, and with the storage units being replaced by designated sections of the computer's main memory.

When an alarm condition exists, for example in sub-sets numbers 10 and 23, then the data block to be transmitted is composed of the address byte of the signal collector S1, a data control byte having a binary number 2, and the two sub-sets having the addresses 10 and 23, for a total of 8 bytes instead of a much larger number of bytes. The signal collector S2 is thus fully informed about the condition of the signals in the entire repertoire of lower-level stations even though only 8 bytes are transmitted.

In the case when all lower-level stations have data or have alarm conditions to report, then the data block is lengthened by 50%, as a consequence of the addresses for each of the two byte sub-sets. This, however, is an exceptional condition. In this case the signal collector S2 is informed by means of a predetermined condition of the data control byte, such as its maximum value, that the following data contains the normal sequence of bytes without addresses. Thus in this case, the lengthening by 50% through the addition of sub-addresses is avoided.

In a further embodiment of the present invention a data block transmitted from a station at each level of the network is constructed in two parts, the first part identifying the status of stations located at the next lower network level, and the second part consisting of data blocks received from the lower-level stations. The status signals may comprise for example a binary 1 or 0 for each station at each level, a binary 1 indicating an error or fault condition, and a binary 0 indicating normal operation.

Figure 7:
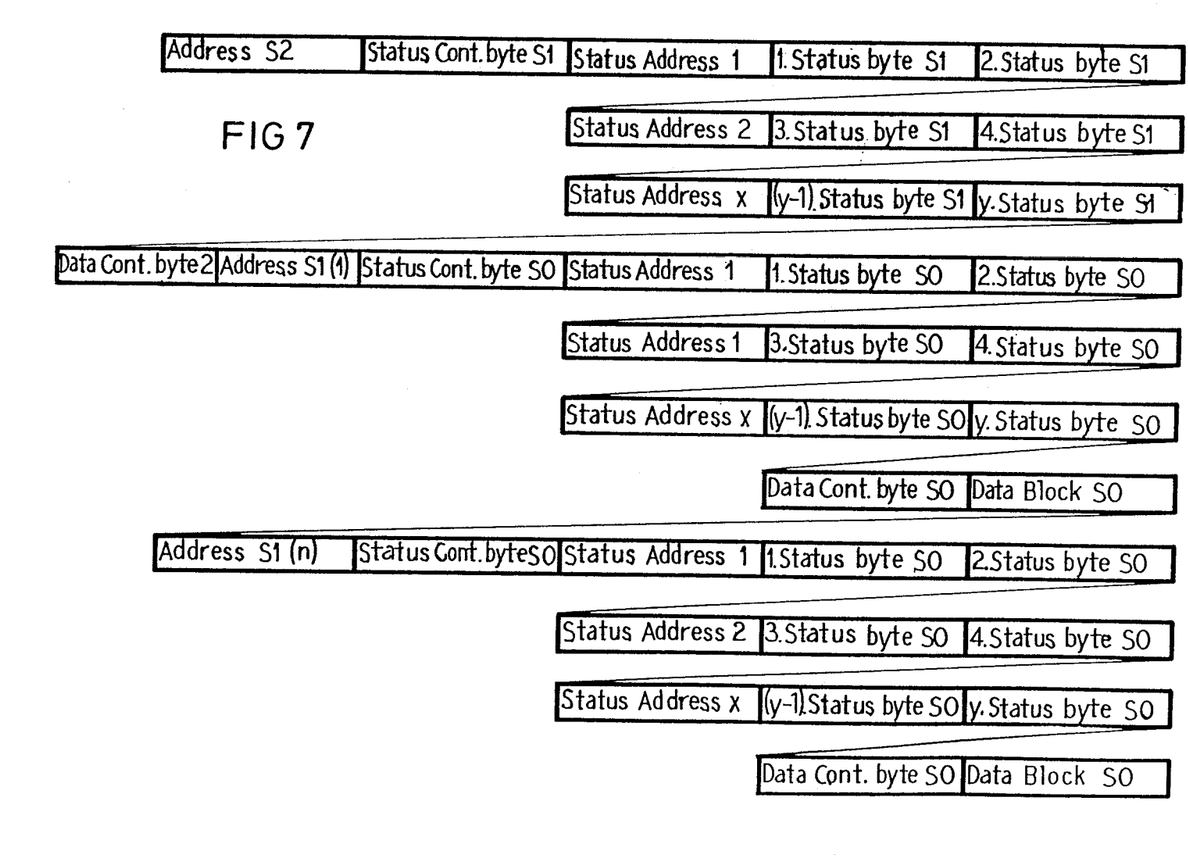
FIG. 7 is an illustration of a data block transmitted by a station of the second network level, with the possibility of data reduction and with self-monitoring.

FIG. 7 illustrates such a data block as transmitted from a station S2 at the second network level. The data block begins with the address S2 of the transmitting station, just as in the data blocks described above. Following this however the data block is divided into two parts. The first part occupying the remainder of the first three lines of FIG. 7 illustrates the status of all of the stations at the next lower-level (the S1 level) which transmit to the station S2. This part of the data block is made up by status control byte S1 which identifies the number of status bytes following in the first three lines of the data block of FIG. 7. Following this is a status address 1 which is a sub-address of the following two bytes which define a sub-set including status byte 1 and status byte 2. Status bytes 1 and 2 each comprise eight bits, so that the sub-set contains 16 status bits, identifying the normal (or fault) condition of 16 of the stations at the next lower-level. In practice, at least one of the two status bytes will contain at least one binary 1, because sub-sets containing all binary 0's are suppressed in the manner described above. Since each status byte reports the status of eight stations, the maximum number of status bytes is about one-eighth of the total number of stations at the next lower-level which are connected to the transmitting station.

The second part of the data block illustrated in FIG. 7 begins at line 4, which comprises the data control byte 2 and the data block received from station S1(*l*), the first station at the next lower-level with status and/or data to report. This data block occupies the next four lines of the data block illustrated in FIG. 7. This is followed by data blocks as transmitted from other S1 stations, ending with S1(*n*), occupying the last four lines of the data block in FIG. 7.

Each of the data blocks received from the lower-level stations is also divided into two parts, the first part indicating the status of stations (or data sources) at the next lower-level, which in the case of the S0 level is the status of the individual data sources of acquisition units. In the data block S1(*n*), occupying the last four lines of FIG. 7, the transmitting station address is followed by the status control byte and by the first part of the data block consisting of status addresses and sub-sets of status bytes. Finally the second part of the block which was transmitted by the S1(*n*) station (in the last line of FIG. 7) comprises the data block of FIG. 4 made up of the S1(*n*) address, the data control byte, and the sub-addresses and data sub-sets received from first level stations, all of which is represented by the last block as illustrated in FIG. 7.

It will be apparent since the first part of the data block, corresponding to the status of lower-level stations, is organized in the same way as the data blocks described above in connection with FIGS. 1 to 6, that the apparatus of the type illustrated in FIGS. 8 and 9 may be employed for constructing the first part of the data byte, relating to the status of lower-level stations, as well as the second part of the data block which has already been described above.

Referring to FIG. 10, apparatus is illustrated for constructing a two-part data block in which the first part reports status information, and the second part reports data blocks received from lower-level stations. When the apparatus of FIG. 10 is used with the lowest level stations, a multiplexer 20*a* is provided for sampling the status of each of the data generators, or the data acquisition means which acquires the data to be transmitted to the upper lower station. The multiplexer 20*a* samples the status of the stations one-by-one, and transmits the sampled information to the input of a status reduction unit 80. The unit 80 may comprise the apparatus illustrated in FIG. 8, by which the first part of the data block is constructed consisting of the transmitting station address, a status control byte indicating the number of status sub-sets in the data block, followed by the sub-addresses and sub-sets of status signals for all of the lines sampled by the multiplexer 20*a*. Another multiplexer 20, corresponds to the multiplexer 20 of FIG. 8, and samples the data lines from the signal sources as described in connection with FIG. 8. Its output is connected to the input register of a data reduction unit 82, which is constructed in the manner illustrated in FIG. 8. Optionally, the station address storage unit may be omitted. The data reduction unit 82 functions in the manner described in connection with FIG. 8, for generating the data control byte, and the sub-addresses and data sub-sets, and storing them all in memory units.

The combined two part data block is forwarded to the next higher level station by first transmitting the information developed by the status reduction unit 80, including the transmitting station identifier address, the status control byte, and the status sub-addresses and sub-sets. These are transmitted through one or more AND gates 57 to the OR gate 46, and on to the network interface unit 48, in the manner which has been described above. Following, the data control byte and the data including sub-addresses and sub-sets is forwarded from the data reduction unit 42 through one or more AND gates 59 to the OR gate 46 and on to the network interface 48. In this manner the two part data block from the S1 level is created, corresponding to the last four lines of FIG. 7. For the S2 level, the apparatus of FIG. 10 generates the larger data block illustrated in FIG. 7, headed by the station identifier address S2 at the second level, followed by the first part of the block comprising the status control byte and status information in the first three lines of FIG. 7, followed by status and data information received from lower-level stations occupying lines 4–11 of FIG. 7. Of course, for any station at the next lower-level which has nothing to report (neither status nor data), then no data block from such station is transmitted further, and the information which is transmitted onward is reduced to that extent.

It should be noted that in each of the data blocks transmitted from lower-level stations as portions of the second part of the data block of FIG. 7, the lower-level station address is repeated twice, once at the beginning of the first part of such data block and once at the beginning of the second part of such data block. Alternatively, the second of these addresses can be deleted, in which case the data control byte follows directly after the status information. This is illustrated in the fourth line of the data block of FIG. 7, in which the address S2 of the transmitting station is not repeated. This form of the data block is accommodated by the apparatus of FIG. 10 by omitting the storage unit for storing the station address (unit 44 in FIG. 8) from the data reduction unit 82.

In the data block illustrated in FIG. 7 the status control byte and the signal control bytes are inserted under individual addresses. When all signal collectors S1 and all signal generators S0 are present (i.e., no bad status to report) and no data signals are in the alarm condition (i.e., data is as expected), then the data block is composed of only three bytes, or only 1.4 percent of the data block without any data reduction at all. The three bytes transmitted are the address S2, the status control byte S1 and the data control byte 2.

Preferably, the signal collectors located at each of the nodes of the network, for generating the associated status bits, each comprises a microcomputer. The signal collector S1 sends information to the signal collector S2, at a regular interval, or when interrogated. The signal collector S2 is thus always informed regarding the most recent status of lower-level stations.

The data reduction without data pre-processing in the nodes of the multi-level network provide the network with a significant advantage over a two level network, since it can more quickly transmit the fact of a change in signal status, particularly when a great number of quantities are being monitored. A four level network transmits the signal change about five times as fast as a two level network.

The formation of sub-sets with their sub-addresses occurs automatically in the nodes of a network, for every node manages a plurality of sub-addresses with a definite quantity of signals and transmits these sub-addresses with its own address at the head of its data block, to the next higher level. Thus the reduction of the data with the assistance of control bytes can be implemented in a simple fashion in the multi-level network. In addition to the address with their data bytes, there are also status addresses with their status bytes. The data bytes indicate the statuses of the signals (i.e., the data) and the status bytes indicate the statuses of the signal generators and nodes, (i.e., normal transmission or not). They form the self-monitoring feature of the overall system.

The data block of FIG. 7 is equipped with a self-monitoring feature. When the station of a level manages 16 or fewer nodes of the next lower-level, then the status address byte may be omitted. Otherwise, a status control data byte indicates how many status sub-addresses follow. It is particularly advantageous to transmit only the sub-sets which contain a message about a station or node which differs from the nominal value such as all zeros.

In the above description, it was assumed that the nominal or most frequently occurring data consists of all binary 0's. In the event that a different pattern is the nominal or quiescent value, such as a predetermined combination of 0's and 1's, then that combination is eliminated from messages transmitted on toward the trunk or head of the tree. This is accommodated by the template storage unit 30 of FIG. 8.

Various other modifications and additions may be made in the apparatus and method of the present invention without departing from the essential features of novelty thereof, which are intended to be defined and secured by the appended claims.

What is claimed is:

1. In a data transmission network having a tree structure with at least one station at one network level being connected by means of a data transmission channel to a station of a higher network level, in which data blocks are normally transmitted between a transmitting station at one level to a station at a different network level, said data blocks including operating status information, indicating normal or abnormal operation signifying that all stations at lower levels have fault-free status or else identifying only those with fault conditions, whereby data relating to normally operating stations is not transmitted to the next higher level, the combination comprising; apparatus at the transmitting stations for monitoring the operating status of the stations of the next lower network level and means responsive to said monitoring for transmitting data blocks to the next higher network level station with a status signal field having at least one status signal byte for indicating normal or abnormal operation of stations at said lower network level, and other data corresponding only to abnormally operating stations at said next lower network level.

2. Apparatus according to claim 1, including means at said transmitting station for constructing a data block having two data block parts and the address of said transmitting station, one of said parts containing said status signals and the other of said parts containing data accepted from a lower level of said network.

3. Apparatus according to claim 1 including means located at said transmitting station for grouping said status signals to be transmitted into a number of sub-sets, comparing means for comparing the information in said sub-sets with predetermined reference status signals corresponding to fault-free operation, and means responsive to said comparing means for suppressing information in said sub-sets at said transmitting station and not transmitting the same to the receiving station.

4. Apparatus according to claim 3, including means for transmitting data control signals prior to said sub-sets containing information identifying the number of the sub-sets following after said control signal within said data block, said sub-sets each including a sub-address identifying the station originally transmitting data in said sub-set.

5. Apparatus according to claim 1, in which said network has a tree structure in which stations of the first network level are each connected to a plurality of data generators and in which there is at least one station at a higher network level, and including means for transmitting data blocks from said transmitting station each containing the address of the transmitting station, a status control signal referring to the non fault-free status of stations immediately monitored by said transmitting station, and a sequence of joined data blocks received at said transmitting station from the stations at the next lower network level.

6. Apparatus according to claim 1, including means located at said transmitting station for the formation of an error message in response to a locally detected error condition.

* * * * *